US012677191B2

(12) United States Patent
Trujillo

(10) Patent No.: US 12,677,191 B2
(45) Date of Patent: Jul. 7, 2026

(54) SYSTEMS AND METHODS FOR A PASS-THROUGH EDGE DATA CENTER (P-EDC) IN A WIRELESS TELECOMMUNICATION NETWORK

(71) Applicant: Boost SubscriberCo L.L.C., Englewood, CO (US)

(72) Inventor: Andrew Trujillo, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 511 days.

(21) Appl. No.: 18/132,844

(22) Filed: Apr. 10, 2023

(65) Prior Publication Data

US 2023/0328590 A1      Oct. 12, 2023

Related U.S. Application Data

(60) Provisional application No. 63/329,852, filed on Apr. 11, 2022.

(51) Int. Cl.
H04W 28/086      (2023.01)
H04W 28/02      (2009.01)
(52) U.S. Cl.
CPC ..... H04W 28/086 (2023.05); H04W 28/0226 (2013.01)

(58) Field of Classification Search
CPC ........................ H04W 28/086; H04W 28/0226
See application file for complete search history.

(56) References Cited

U.S. PATENT DOCUMENTS

2022/0124543 A1* 4/2022 Orhan ...................... G06N 3/08

* cited by examiner

*Primary Examiner* — Nizam U Ahmed
(74) *Attorney, Agent, or Firm* — Jeremiah J. Baunach; Frontier IP Law PLLC

(57) ABSTRACT

Example embodiments are directed towards systems and for a pass-through edge data center (P-EDC) in a 5G wireless telecommunication network having a disaggregated, flexible and virtualized radio access network (RAN) implemented on a cloud computing service provider cloud. The P-EDC may provide a direct circuit fiber connection from the distributed unit (DU) directly to the primary physical data center (e.g., a breakout edge data center (B-EDC)) hosting the centralized unit (CU). In some embodiments, the local data center (LDC), P-EDC, and/or the B-EDC may be co-located or in a single location. The CU 102 may be connected to a regional cloud data center (RDC), which in turn may be connected to a national cloud data center (NDC). The hardware of the P-EDC, the LDC, the cell site 116 and the RU 106 may all be managed, owned and/or controlled by one or more mobile network operators, whereas the hardware of the B-EDC, the RDC and the NDC may all be managed, hosted and/or owned by a cloud computing service provider.

20 Claims, 6 Drawing Sheets

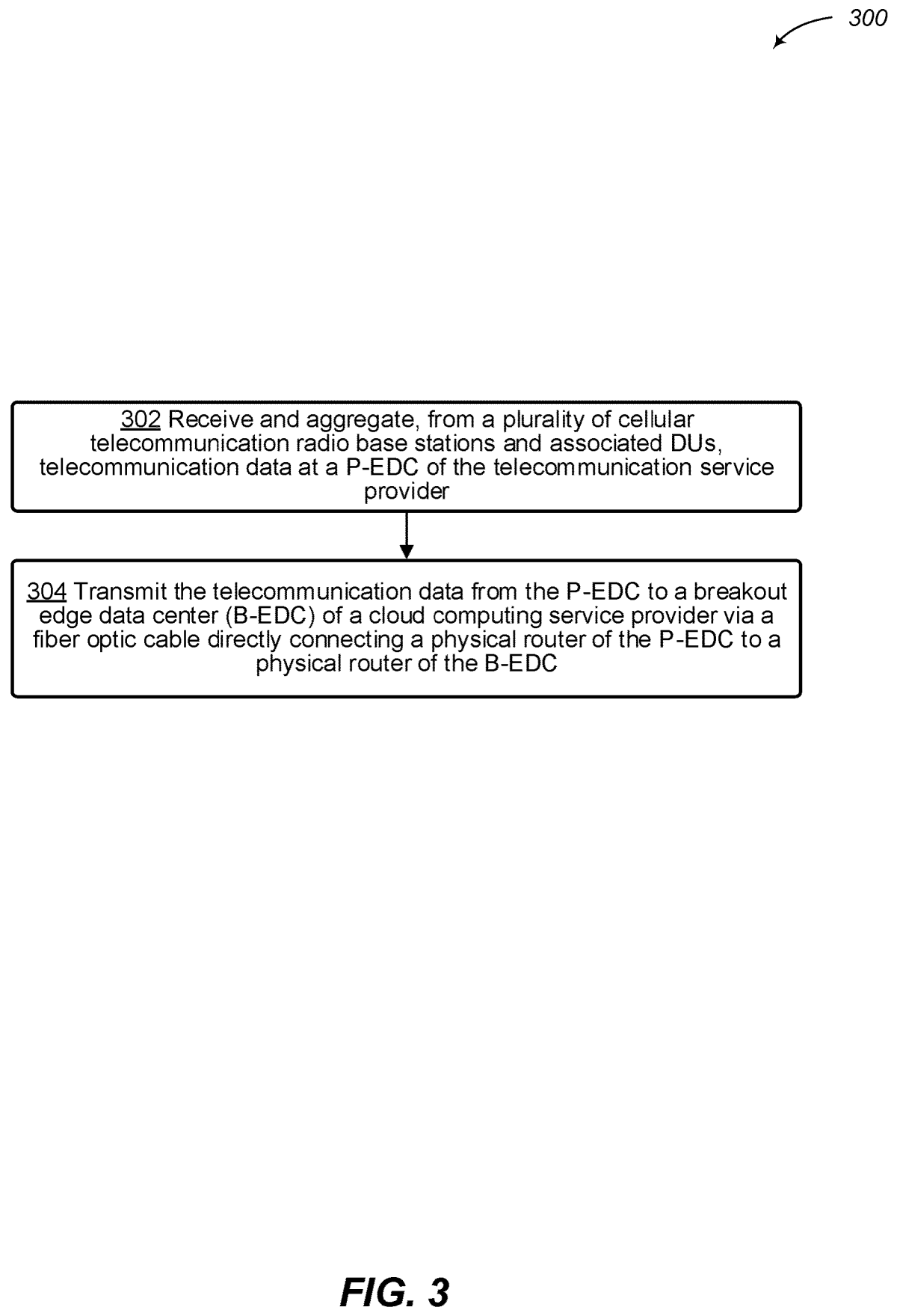

*300*

302 Receive and aggregate, from a plurality of cellular telecommunication radio base stations and associated DUs, telecommunication data at a P-EDC of the telecommunication service provider 304 Transmit the telecommunication data from the P-EDC to a breakout edge data center (B-EDC) of a cloud computing service provider via a fiber optic cable directly connecting a physical router of the P-EDC to a physical router of the B-EDC

*FIG. 3*

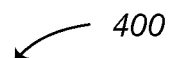

*400*

402 physically locating the B-EDC of the cloud computing service provider at the colo with the physical router of the P-EDC of the telecommunication service provider 404 Causing the B-EDC to be implemented on at least one VPC including a first VPC on a particular local zone of a plurality of local zones of the cloud computing service provider 406 Causing the first VPC to be at least partially hosted by the physical router of the B-EDC.

408 Route, at the local zone, using the first VPC, at least some of the telecommunication data via GRE tunneling to an Internet VPC that provides Internet connectivity and is hosted by the B-EDC at the local zone 410 Route, at the local zone, using the the first VPC, at least some of the telecommunication data via GRE tunneling to an RDC of the cloud computing service provider, the RDC being separated geographically from the B-EDC

FIG. 4

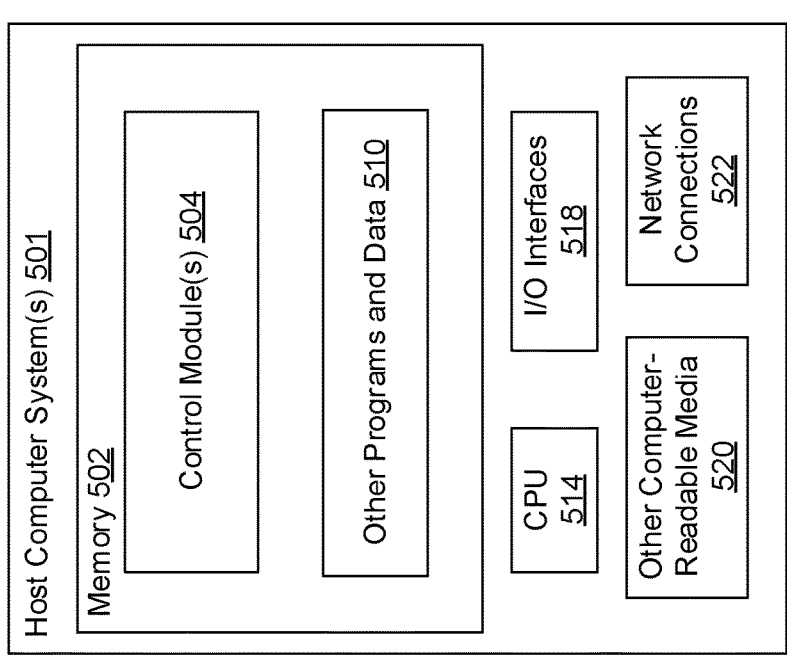
*FIG. 5*

SYSTEMS AND METHODS FOR A PASS-THROUGH EDGE DATA CENTER (P-EDC) IN A WIRELESS TELECOMMUNICATION NETWORK

TECHNICAL FIELD

The present disclosure relates generally to telecommunication networks, more particularly, to systems and methods for a P-EDC in a wireless telecommunication network.

BRIEF SUMMARY

The advent and implementation of Fifth Generation (5G) wireless technology has resulted in faster speeds and increased bandwidth, but it is also advantageous to provide such services minimizing latency and service interruptions efficiently in a disaggregated construct and architecture using a cloud computing service provider. It is with respect to these and other considerations that the embodiments described herein have been made. 5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Briefly described, embodiments disclosed herein are directed toward systems and methods for systems and methods for a pass-through edge data center (P-EDC) in a wireless telecommunication network, such as a wireless 5G network. Example embodiments include a method for transmitting telecommunication data comprising receiving and aggregating, from a plurality of cellular telecommunication radio base stations and associated distributed units (DUs) of a fifth-generation New Radio (5G NR) cellular telecommunication network of a telecommunication service provider, telecommunication data at a pass-through edge data center (P-EDC) of the telecommunication service provider. The P-EDC is physically located at a colocation data center (colo) in which servers and other network equipment of different companies are physically co-located in a same physical facility. The telecommunication data is then transmitted from the P-EDC to a breakout edge data center (B-EDC) of a cloud computing service provider via a fiber optic cable directly connecting a physical router of the P-EDC to a physical router of the B-EDC. The B-EDC hosts for the telecommunication service provider a 5G NR centralized unit (CU) corresponding to one or more of the DUs. In an example embodiment, the B-EDC of the cloud computing service provider is also physically located at the colo with the physical router of the P-EDC of the telecommunication service provider.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 3 illustrates a logical flow diagram showing an example embodiment of a process for transmitting telecommunication data involving a P-EDC in accordance with embodiments described herein.

FIG. 4 illustrates a logical flow diagram showing an example embodiment of a process for transmitting telecommunication data involving a P-EDC involving further additional operations in accordance with embodiments described herein.

FIG. 5 shows a system diagram that describes an example implementation of a computing system(s) for implementing embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
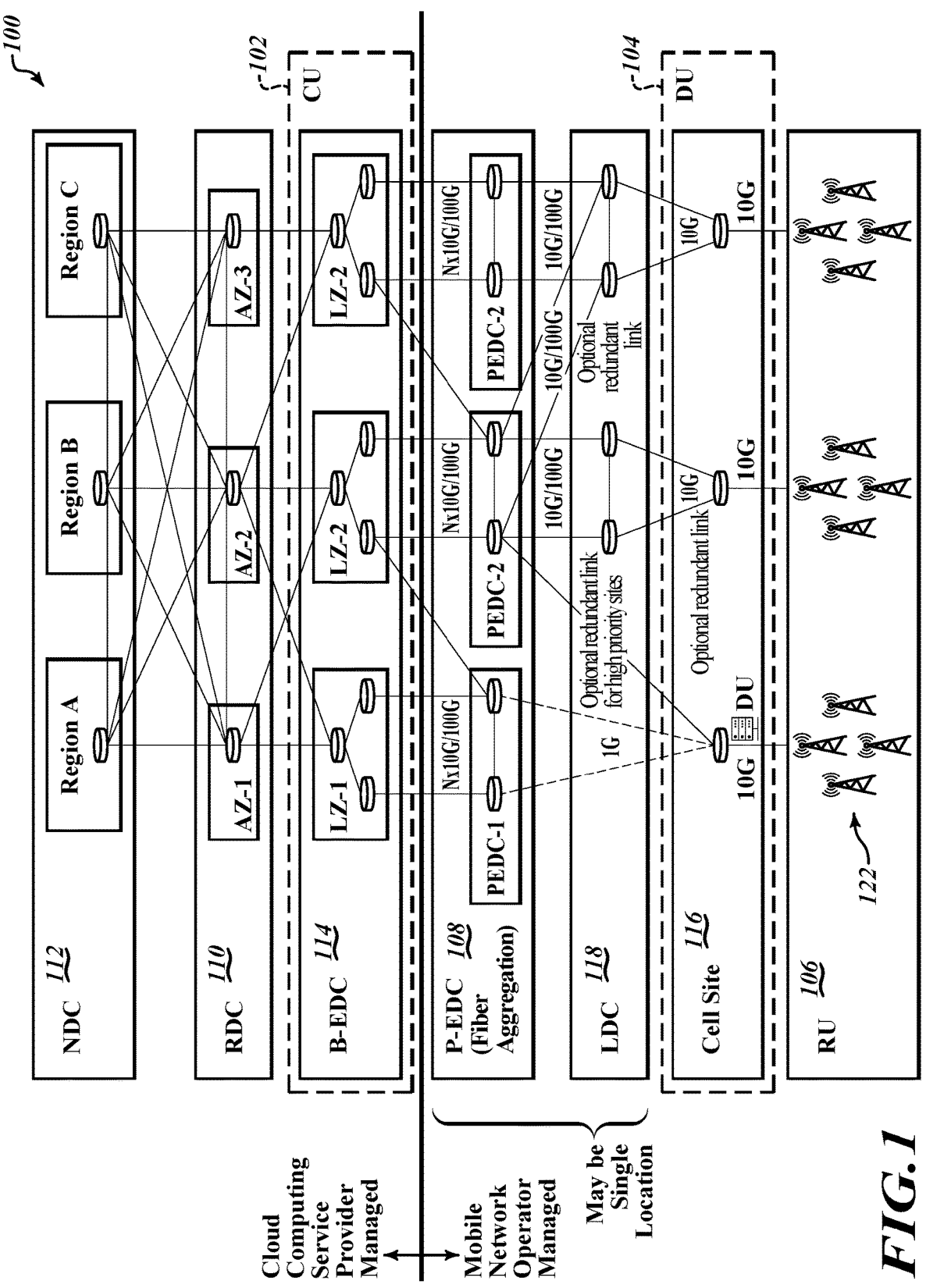
FIG. 1 illustrates a diagram of an example system architecture overview of a system in which systems and methods for a P-EDC in a wireless telecommunication network may be implemented in accordance with embodiments described herein.

FIG. 1 illustrates a diagram of an example system architecture overview of a system in which systems and methods for a P-EDC in a wireless telecommunication network may be implemented in accordance with embodiments described herein.

The system 100 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 1, a 5G RAN is split into DUs (e.g., DU 104) that manage scheduling of all the users and a CU 102 that manages the mobility and radio resource control (RRC) state for all the UEs. The RRC is a layer within the 5G NR protocol stack.

As shown in FIG. 1, the radio unit (RU) 106 converts radio signals sent to and from the antenna of base stations 122 into a digital signal for transmission over packet networks. It handles the digital front end (DFE) and the lower physical (PHY) layer, as well as the digital beamforming functionality.

The DU 104 may sit close to the RU 106 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 102.

The CU 102 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 102 and DU 104 depending on midhaul availability and network design. The CU 102 is a logical node that includes the gNb functions like transfer of user data, mobility control, RAN sharing, positioning, session management etc., with the exception of functions that may be allocated exclusively to the DU 104. The CU 102 controls the operation of several DUs 104 over the midhaul interface.

As mentioned above, 5G network functionality is split into two functional units: the DU 104, responsible for real time 5G layer 1 (L1) and 5G layer 2 (L2) scheduling functions, and the CU 102 responsible for non-real time, higher L2 and 5G layer 3 (L3). As shown in FIG. 1, the DU's server and relevant software may be hosted on a cell site 116 itself or can be hosted in an edge cloud (local data center (LDC) 118 or central office) depending on transport availability and fronthaul interface. The CU's server and relevant software may be hosted in a regional cloud data center or, as shown in FIG. 1, in a breakout edge data center (B-EDC) 114. As shown in FIG. 1, the DU 104 may be provisioned to communicate via a pass through edge data center (P-EDC) 108. The P-EDC 108 may provide a direct circuit fiber connection from the DU directly to the primary physical data center (e.g., B-EDC 114) hosting the CU 102. In some embodiments, the LDC 118, P-EDC 108 and/or the B-EDC 114 may be co-located or in a single location. The CU 102 may be connected to a regional cloud data center (RDC) 110, which in turn may be connected to a national cloud data center (NDC) 112. In the example embodiment, the P-EDC 108, the LDC 118, the cell site 116 and the RU 106 may all be managed and/or controlled by the mobile network operator and the B-EDC 114, the RDC 110 and the NDC 112 may all be managed and/or hosted by a cloud computing service provider. According to various embodiments, the actual split between DU and RU may be different depending on the specific use-case and implementation.

Figure 2A:
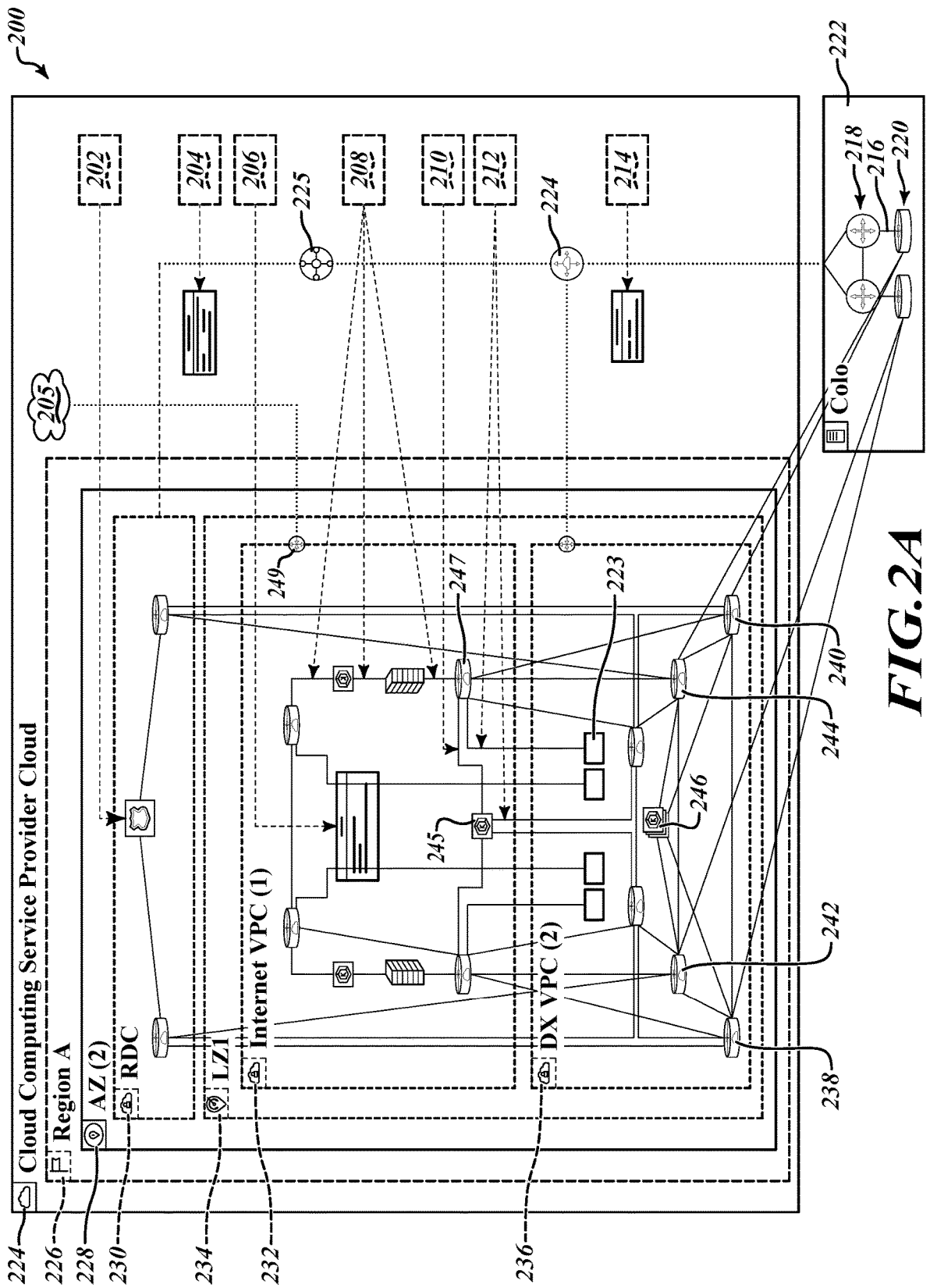
FIG. 2A is a diagram showing connectivity between certain telecommunication network components involved in systems and methods for a P-EDC in a wireless telecommunication network in accordance with embodiments described herein.

FIG. 2A is a diagram showing connectivity between certain telecommunication network components 200 involved in systems and methods for a P-EDC in a wireless telecommunication network in accordance with embodiments described herein.

Shown is a colocation data center (colo) 222 in which servers and other network equipment of different companies are physically co-located in the same physical facility. P-EDC routers 220, which are located in colo 222, receive and aggregate telecommunication data from a plurality of cellular telecommunication radio base stations and associated DUs, such as those of cell site 116 and DU 104 of FIG. 1, of an MNO, such as a 5G NR cellular telecommunication network of a telecommunication service provider.

One or more P-EDC routers 220 may transmit the telecommunication data to one or more physical routers (direct connect routers 218) of a breakout edge data center (B-EDC) of a cloud computing service provider cloud 224. In the present example embodiment, the transmission of such telecommunication data is made via connections including a fiber optic cable 216 directly connecting one of the P-EDC routers 220 to a corresponding one of the direct connect routers 218 the B-EDC.

The B-EDC hosts for the telecommunication service provider a 5G NR CU, disaggregated into CU-UP/CU-CP 246 corresponding to one or more of the DUs represented by DU 104 of FIG. 1. In the present example, one or more virtual routers (vRouters) of direct connect virtual private cloud (VPC) 236 provided by cloud computing service provider cloud 224 may be logically connected to and/or otherwise correspond to P-EDC routers 220. For example, vRouter 238, vRouter 240, vRouter 242 and vRouter 244 may be logically connected to corresponding ones of to P-EDC routers 220 as shown in FIG. 2A.

The B-EDC is implemented within local zone 234 of cloud computing service provider cloud 224. A local zone of a cloud computing service provider is a type of infrastructure deployment that places compute, storage, database, and other select cloud computing service provider services close to large population and industry centers. In the present example, the local zone 234 may selected based on its geographic proximity to particular cellular sites (e.g. a cellular site serving base stations 122) and/or a group of MNO cellular telephone users or cellular telephone or Internet of Things (IoT) devices (referred to as user equipment devices (UEs)).

In an example embodiment, the telecommunication network components 200 route, at the local zone 234, using the VPC 236, at least some of the telecommunication data via Generic Routing Encapsulation (GRE) tunneling via GRE subnet 223 to an Internet VPC 232 that provides connectivity to the Internet 205 and is hosted by the B-EDC at the local zone 234. The telecommunication network components 200 also route, at the local zone 234, using the direct connect VPC 236, at least some of the telecommunication data via GRE tunneling to a regional data center (RDC) 230 of the cloud computing service provider cloud 224. The RDC 230 may be separated geographically from the B-EDC.

In an example embodiment, local gateway (LGW) route table 214 is implemented for routing to transit gateway (TGW) 225 (to reach RDC 230) via a direct connect gateway (DXG) 224. Connections 212 may be AWS Elastic Network Interface (ENI) xENI connections (e.g., in VMware® Cloud on Amazon Web Services (AWS) Compute virtual machines (VM)) from direct connect VPC 236 for GRE tunneling, 5G N2 interface functionality (which connects the gNodeB to the Access and Mobility Management Function, or AMF), 5G N3 interface functionality (which connects the gNodeB (RAN) to the 5G User Plane Function (UPF) 245), operations, administration and maintenance (OAM), signaling, etc. The UPF 245 advertises the Internet Protocol (IP) pool to virtual routers (e.g., vRouter 247) over the 5G N6 interface (public IUP address) via connection 210. Also shown are static routes 208 and ENI based routing 206 to route traffic to the 5G N6 interface on virtual routers (vRouters). Ingress routing 204 is enabled to route the assigned IP Public /23 to the LGW 249. The domain name service (DNS) resolver 202 may be provisioned in the RDC 230 and is attached to an 5G N6 interface, but may be replaced with an on-premises, cloud-native core networking security service platform (e.g., such as that from Infoblox®) in the B-EDC.

Figure 2B:
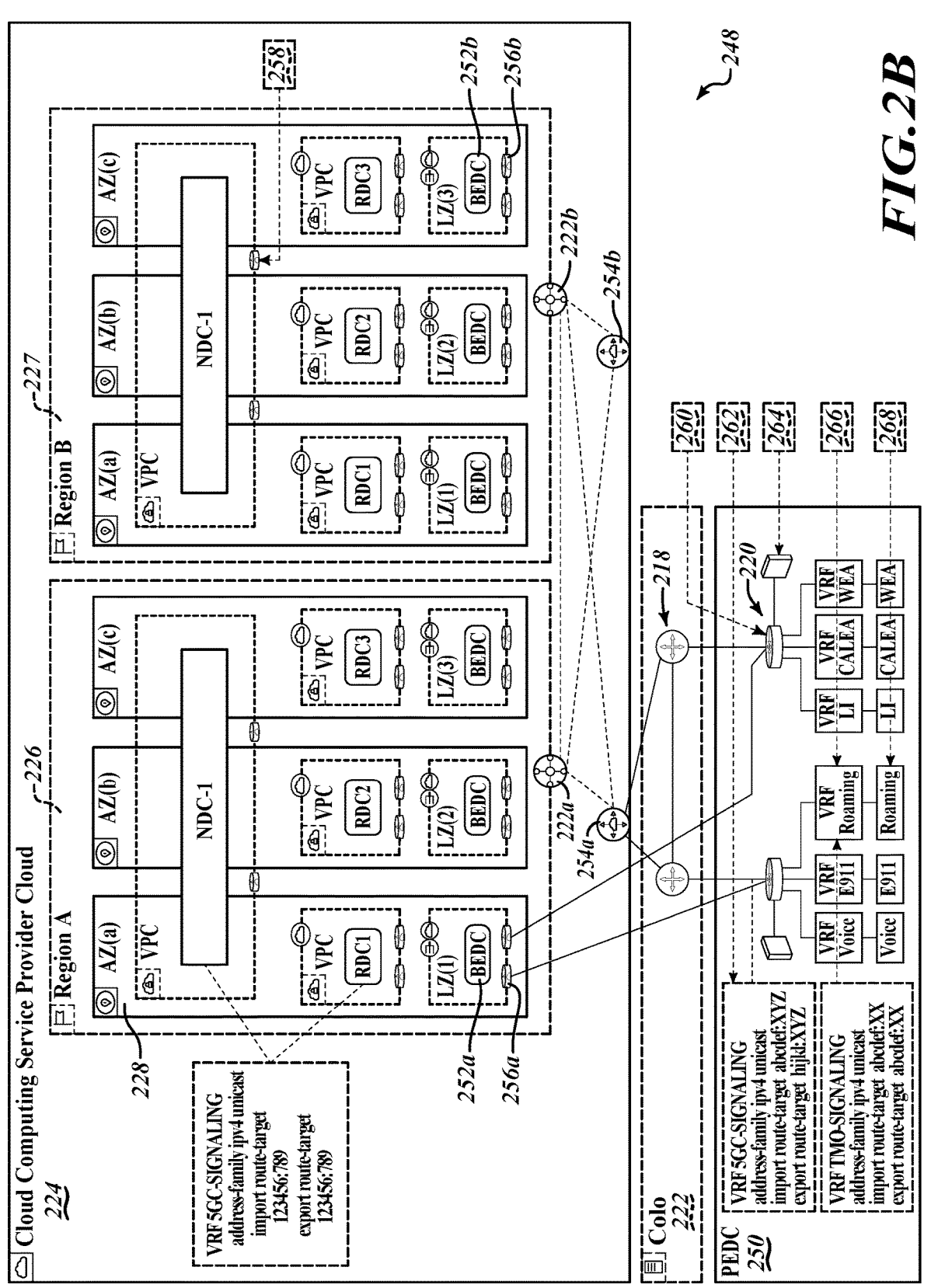
FIG. 2B is a diagram showing connectivity between certain telecommunication network components in a colocation data center involved in systems and methods for a P-EDC in a wireless telecommunication network in accordance with embodiments described herein.

FIG. 2B is a diagram showing connectivity between certain telecommunication network components 248 in a colocation data center 222 involved in systems and methods for a P-EDC in a wireless telecommunication network in accordance with embodiments described herein.

Shown is a P-EDC 250 located in colo 222. P-EDC routers 220, which are located in colo 222, receive and aggregate telecommunication data from a plurality of cellular telecommunication radio base stations and associated DUs, such as those of cell site 116 and DU 104 of FIG. 1, of an MNO, such as a 5G NR cellular telecommunication network of a telecommunication service provider. For example, unique virtual routing and forwarding (VRF) roaming 366 is implemented per roaming partner or service 268. VRF is an IP-based computer network technology that enables the simultaneous co-existence of multiple virtual routers (vRouters) as instances or virtual router instances within the same router (e.g., one or more of P-EDC routers 220). The roaming partner interconnect may be made using Border Gateway Protocol (BGP), for example, which is a standardized exterior gateway protocol designed to exchange routing and reachability information between autonomous systems on the Internet. VRF interworking may be performed in the firewall 264 and strict firewall rules may be implemented to control ingress/egress telecommunication traffic. The VRF is mapped to corresponding VRF via mappings 262 based on the Service/Access required. The telecommunication traffic will be "marked" 260 with an extended BGP community that identifies the location and type.

One or more P-EDC routers 220 may transmit the telecommunication traffic to one or more physical routers (direct connect routers 218) of a B-EDC (e.g., B-EDC 252a) of a cloud computing service provider cloud 224. In the present example embodiment, the transmission of such telecommunication data is made via connections including a fiber optic cable 216 directly connecting one of the P-EDC routers 220 to a corresponding one of the direct connect routers 218 the B-EDC 252a. One or more vRouters 256a may be implemented via or correspond to one or more of the direct connect routers 218. The vRouters 256a may be connected to a direct connect gateway 254a that connects to the RDC 226 via a corresponding direct connect gateway 222a of the RDC 226. In various embodiments, there may be additional RDCs, such as RDC 227. RDC 227 may also include one or more B-EDCs implementing one or more implementing vRouters, such as B-EDC 252b implementing vRouter 256b. The direct connect gateway 254a that connects to the RDC 226 may also connect for redundancy and failover purposes to RDC 227 via a corresponding direct connect gateway 222b of RDC 227. Direct connect gateway 254b, which may also connect another corresponding P-EDC, also connects to the RDC 227 via direct connect gateway 222b of RDC 227. At the desired data center router (e.g., data center router vRouter 258), telecommunication traffic is matched based on BGP extended community and prioritized.

FIG. 3 illustrates a logical flow diagram showing an example embodiment of a process 300 for transmitting telecommunication data involving a P-EDC in accordance with embodiments described herein.

At 302, the system 100 receives and aggregates, from a plurality of cellular telecommunication radio base stations and associated distributed units (DUs) of a fifth-generation New Radio (5G NR) cellular telecommunication network of a telecommunication service provider, telecommunication data (which may include telecommunication traffic) at a pass-through edge data center (P-EDC) of the telecommunication service provider. The P-EDC is physically located at a colo in which servers and other network equipment of different companies are physically co-located in a same physical facility.

At 304, the system 100 transmits the telecommunication data from the P-EDC to a breakout edge data center (B-EDC) of a cloud computing service provider via a fiber optic cable directly connecting a physical router of the P-EDC to a physical router of the B-EDC. In an example embodiment, the B-EDC hosts for the telecommunication service provider a 5G NR centralized unit (CU) corresponding to one or more of the DUs. Also, the B-EDC of the cloud computing service provider may also be physically located at the colo with the physical router of the P-EDC of the telecommunication service provider.

FIG. 4 illustrates a logical flow diagram showing an example embodiment of a process 400 for transmitting telecommunication data involving a P-EDC involving further additional operations in accordance with embodiments described herein.

At 402, the B-EDC of the cloud computing service provider is physically located at the colo with the physical router of the P-EDC of the telecommunication service provider.

At 404, the system 100 causes the B-EDC to be implemented on at least one virtual private cloud (VPC) including a first VPC on a particular local zone of a plurality of local zones of the cloud computing service provider. The particular local zone having is selected based on a geographical proximity of the particular local zone to one or more of the radio base stations.

At 406, the system 100 causes the first VPC is at least partially hosted by the physical router of the B-EDC.

At 408, the system 100 routes, at the local zone, using the first VPC, at least some of the telecommunication data via Generic Routing Encapsulation (GRE) tunneling to an Internet VPC that provides Internet connectivity and is hosted by the B-EDC at the local zone.

At 410, the system 100 routes, at the local zone, using the first VPC, at least some of the telecommunication data via GRE tunneling to a regional data center (RDC) of the cloud computing service provider, the RDC being separated geographically from the B-EDC.

FIG. 5 shows a system diagram that describes an example implementation of a computing systems (or systems) 500 for implementing embodiments described herein.

The functionality described herein for a P-EDC in a wireless telecommunication network, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 5 illustrates an example of underlying hardware on which such software and functionality may be hosted and/or implemented.

In particular, shown is example host computer system(s) 501. For example, such computer system(s) 501 may represent one or more of those in various data centers, base stations and cell sites shown and/or described herein that are, or that host or implement the functions of: routers, components, microservices, virtual machines, and other aspects described herein to implement a P-EDC and B-EDC in a wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein to implement a P-EDC and B-EDC in a wireless telecommunication network. Memory 502 may also store other programs and data 510, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for transmitting telecommunication data comprising:
   receiving and aggregating, from a plurality of cellular telecommunication radio base stations and associated distributed units (DUs) of a fifth-generation New Radio (5G NR) cellular telecommunication network of a telecommunication service provider, telecommunication data at a pass-through edge data center (P-EDC) of the telecommunication service provider, wherein the P-EDC is physically located at a colocation data center (colo) in which servers and other network equipment of different companies are physically co-located in a same physical facility; and
   transmitting the telecommunication data from the P-EDC to a breakout edge data center (B-EDC) of a cloud computing service provider via a fiber optic cable directly connecting a physical router of the P-EDC to a physical router of the B-EDC, wherein the B-EDC hosts for the telecommunication service provider a 5G NR centralized unit (CU) corresponding to one or more of the DUs.

2. The method of claim 1 wherein the B-EDC of the cloud computing service provider is also physically located at the colo with the physical router of the P-EDC of the telecommunication service provider.

3. The method of claim 2 wherein the B-EDC is implemented on at least one virtual private cloud (VPC) including a first VPC on a particular local zone of a plurality of local zones of the cloud computing service provider, the particular local zone having been selected based on a geographical proximity of the particular local zone to one or more of the radio base stations.

4. The method of claim 3 wherein the first VPC is at least partially hosted by the physical router of the B-EDC.

5. The method of claim 4, further comprising:
   routing, at the local zone, using the first VPC, at least some of the telecommunication data via Generic Routing Encapsulation (GRE) tunneling to an Internet VPC that provides Internet connectivity and is hosted by the B-EDC at the local zone.

6. The method of claim 5, further comprising:
   routing, at the local zone, using the first VPC, at least some of the telecommunication data via GRE tunneling to a regional data center (RDC) of the cloud computing service provider, the RDC being separated geographically from the B-EDC.

7. The method of claim 1 wherein the telecommunication data includes telecommunication traffic data.

8. A system for transmitting telecommunication data, the system comprising:
   at least one memory that stores computer executable instructions; and
   at least one processor that executes the computer executable instructions to cause actions to be performed, the actions including:
      receiving and aggregating, from a plurality of cellular telecommunication radio base stations and associated distributed units (DUs) of a fifth-generation New Radio (5G NR) cellular telecommunication network of a telecommunication service provider, telecommunication data at a pass-through edge data center (P-EDC) of the telecommunication service provider, wherein the P-EDC is physically located at a colocation data center (colo) in which servers and other network equipment of different companies are physically co-located in a same physical facility; and
      transmitting the telecommunication data from the P-EDC to a breakout edge data center (B-EDC) of a cloud computing service provider via a fiber optic cable directly connecting a physical router of the P-EDC to a physical router of the B-EDC, wherein the B-EDC hosts for the telecommunication service provider a 5G NR centralized unit (CU) corresponding to one or more of the DUs.

9. The system of claim 8 wherein the B-EDC of the cloud computing service provider is also physically located at the colo with the physical router of the P-EDC of the telecommunication service provider.

10. The system of claim 9 wherein the B-EDC is implemented on at least one virtual private cloud (VPC) including a first VPC on a particular local zone of a plurality of local zones of the cloud computing service provider, the particular local zone having been selected based on a geographical proximity of the particular local zone to one or more of the radio base stations.

11. The system of claim 10 wherein the first VPC is at least partially hosted by the physical router of the B-EDC.

12. The system of claim 11, wherein the at least one processor executes the computer instructions to cause further actions to be performed including:
   routing, at the local zone, using the first VPC, at least some of the telecommunication data via Generic Routing Encapsulation (GRE) tunneling to an Internet VPC that provides Internet connectivity and is hosted by the B-EDC at the local zone.

13. The system of claim 12, wherein the at least one processor executes the computer instructions to cause further actions to be performed including:

routing, at the local zone, using the first VPC, at least some of the telecommunication data via GRE tunneling to a regional data center (RDC) of the cloud computing service provider, the RDC being separated geographically from the B-EDC.

14. The system of claim 8 wherein the telecommunication data includes telecommunication traffic data.

15. A non-transitory computer-readable storage medium having computer-executable instructions stored thereon that, when executed by at least one processor, cause the at least one processor to cause actions to be performed, the actions including:

receiving and aggregating, from a plurality of cellular telecommunication radio base stations and associated distributed units (DUs) of a fifth-generation New Radio (5G NR) cellular telecommunication network of a telecommunication service provider, telecommunication data at a pass-through edge data center (P-EDC) of the telecommunication service provider, wherein the P-EDC is physically located at a colocation data center (colo) in which servers and other network equipment of different companies are physically co-located in a same physical facility; and transmitting the telecommunication data from the P-EDC to a breakout edge data center (B-EDC) of a cloud computing service provider via a fiber optic cable directly connecting a physical router of the P-EDC to a physical router of the B-EDC, wherein the B-EDC hosts for the telecommunication service provider a 5G NR centralized unit (CU) corresponding to one or more of the DUs.

16. The non-transitory computer-readable storage medium of claim 15 wherein the B-EDC of the cloud computing service provider is also physically located at the colo with the physical router of the P-EDC of the telecommunication service provider.

17. The non-transitory computer-readable storage medium of claim 16 wherein the B-EDC is implemented on at least one virtual private cloud (VPC) including a first VPC on a particular local zone of a plurality of local zones of the cloud computing service provider, the particular local zone having been selected based on a geographical proximity of the particular local zone to one or more of the radio base stations.

18. The non-transitory computer-readable storage medium of claim 17 wherein the first VPC is at least partially hosted by the physical router of the B-EDC.

19. The non-transitory computer-readable storage medium of claim 18, wherein the computer-executable instructions stored thereon, when executed by the at least one processor, cause the at least one processor to cause further actions to be performed, the further actions including:

routing, at the local zone, using the first VPC, at least some of the telecommunication data via Generic Routing Encapsulation (GRE) tunneling to an Internet VPC that provides Internet connectivity and is hosted by the B-EDC at the local zone.

20. The non-transitory computer-readable storage medium of claim 19, wherein the computer-executable instructions stored thereon, when executed by the at least one processor, cause the at least one processor to cause further actions to be performed, the further actions including:

routing, at the local zone, using the first VPC, at least some of the telecommunication data via GRE tunneling to a regional data center (RDC) of the cloud computing service provider, the RDC being separated geographically from the B-EDC.

\* \* \* \* \*